(12) United States Patent
Choi et al.

(10) Patent No.: US 8,319,473 B2
(45) Date of Patent: Nov. 27, 2012

(54) WIRELESS ENERGY TRANSMISSION STRUCTURE

(75) Inventors: Jae Won Choi, Seoul (KR); Eung Ju Kim, Gyunggi-do (KR); Kwang Du Lee, Gyunggi-do (KR); Chul Gyun Park, Gyunggi-do (KR); Jeong Hoon Kim, Seoul (KR); Jung Ho Yoon, Gyunggi-do (KR); Sang Hoon Hwang, Seoul (KR); Chul Hun Seo, Seoul (KR)

(73) Assignees: Samsung Electro-Mechanics Co., Ltd., Suwon, Gyunggi-Do (KR); Soongsil University Research Consortium techo-Park, Seoul (KR)

( * ) Notice: Subject to any disclaimer, the term of this patent is extended or adjusted under 35 U.S.C. 154(b) by 304 days.

(21) Appl. No.: 12/833,662

(22) Filed: Jul. 9, 2010

(65) Prior Publication Data
US 2011/0241609 A1 Oct. 6, 2011

(30) Foreign Application Priority Data
Apr. 5, 2010 (KR) .................. 10-2010-0031052

(51) Int. Cl.
*H01M 10/46* (2006.01)
(52) U.S. Cl. ........................... 320/108
(58) Field of Classification Search ............... 320/107, 320/108
See application file for complete search history.

(56) References Cited

U.S. PATENT DOCUMENTS
7,911,386 B1 * 3/2011 Itoh et al. ............... 343/700 MS
2009/0160718 A1 * 6/2009 Yen et al. .................. 343/742

FOREIGN PATENT DOCUMENTS
KR 1020070050051 5/2007

OTHER PUBLICATIONS
Office Action from counterpart Korean Patent Application No. 10-2010-0031052, mailed Jun. 20, 2011, 4 pages.

* cited by examiner

*Primary Examiner* — Edward Tso
(74) *Attorney, Agent, or Firm* — Blakely Sokoloff Taylor & Zafman LLP (57) ABSTRACT

Disclosed herein is a wireless energy transmission structure, which includes a printed circuit board, a disk section, and a wire section. The printed circuit board is formed in a ring type, the disk section is constituted by a first conductive plate and a second conductive plate formed on portions of the printed circuit board corresponding to each other to be spaced by a predetermined gap and a dielectric material inserted between the first conductive plate and the second conductive plate, and the wire section is constituted by a plurality of meta cells having a meta material structure, which are repetitively formed to surround the exterior and interior of the printed circuit board and a transmission line connected to each of the first conductive plate and the second conductive plate and surround the plurality of meta cells.

17 Claims, 5 Drawing Sheets

WIRELESS ENERGY TRANSMISSION STRUCTURE

CROSS REFERENCE TO RELATED APPLICATION

This application claims the benefit of Korean Patent Application No. 10-2010-0031052, filed on Apr. 5, 2010, entitled "Wireless Energy Transmission Structure", which is hereby incorporated by reference in its entirety into this application.

BACKGROUND OF THE INVENTION

1. Technical Field

The present invention relates to a wireless energy transmission structure.

2. Description of the Related Art

With the rapid development of a wireless communication technology, new application fields that seemed feasible only in virtual reality are now being newly challenged and many fields are being rapidly implemented and thus realized.

Of them, fields that attracts the most public attention include a U-city using a ubiquitous sensor network (USN), a femto cell field for enabling a home network, a robot serving as a house keeper, an unmanned vehicle performing an emergency mission during a wartime operation, a space solar power generation capable of solving future energy and environment problems, etc.

These application fields collect information in each field and can recognize, prevent, and control all the matters by using the collected information.

Even though systems adopted in these application fields can perform wireless communication, they still have problems in energy supply and transmission. Therefore, the systems cannot be referred to as a wireless communication system or a wireless system in the true sense and have significant problems in the lifespan of a battery or fuel and wirelessly transmissible energy amount.

Meanwhile, an inductance coupling technology by an electromagnetic wave called an electromagnetic induction method is used in an electromotive toothbrush, a notebook, a workman, etc., but the inductance coupling technology by the electromagnetic wave has a disadvantage in that when a coupling coefficient of an inductor is low, energy transmission efficiency is rapidly deteriorated, such that when it deviates from a predetermined location, wireless energy transmission becomes unworkable.

As a result, in order to solve problems such as low power, a transmission distance and a transmissible energy amount, a continuously operable time, etc., a magnetic resonance technology is being developed, which transmits power in the energy form by concentrating energy at a predetermined resonance frequency by an inductor and a capacitor although it is similar to the electromagnetic induction method.

A wireless energy transmission structure using the magnetic resonance technology has an advantage of transmitting comparatively larger power than the electromagnetic induction method up to several meters, but it requires a high quality factor.

In general, the wireless energy transmission structure using the magnetic resonance technology includes a disk section constituted by two conductive plates and a dielectric inserted between the two conductive plates and a ring-type wire section connected to both ends of the disk part.

In the wireless energy transmission structure, when energy is supplied to both ends of a wire of a wireless energy transmitting device, an electric field is formed by the capacitance of a disk depending on the supplied energy and a magnetic field is formed by an inductance of the wire.

At this time, the electric field formed in the disk and the magnetic field formed by the wire periodically exchange energy with each other and the magnetic field is formed between the wireless energy transmitting device and a wireless energy receiving device by the periodic energy exchange.

As such, the magnetic field formed between the wireless energy transmitting device and the wireless energy receiving device allows the magnetic field and the electric field to be formed in a wire and a disk of the wireless energy receiving device.

That is, the electric field and the magnetic field are formed even in the wireless energy receiving device similar to the wireless energy transmitting device.

As a result, the wireless energy receiving device supplies the energy transmitted from the wireless energy transmitting device to an electrical device through the wire.

The wireless energy transmission structure using the magnetic resonance technology, which has such a structure should have the large intensities of the electric field and the magnetic field generated in the disk section and the wire section in order to achieve the high quality factor.

However, since the wireless energy transmission structure in the prior art should have a large-sized disk section and a large-sized wire section in order to increase the electric field and the magnetic field, it is not suitable to actually adopt as the wireless energy transmitting and receiving devices.

SUMMARY OF THE INVENTION

The present invention has been made in an effort to provide a wireless energy transmission structure that can be minimized and easily manufactured, and improve a transmission distance and transmission efficiency by forming a wire with a meta material structure and using a variable capacitor.

A wireless energy transmission structure according to a preferred embodiment of the present invention includes: a ring-type printed circuit board; a disk section constituted by a first conductive plate and a second conductive plate formed on portions of the printed circuit board corresponding to each other to be spaced by a predetermined gap and a dielectric material inserted between the first conductive plate and the second conductive plate; and a wire section constituted by a plurality of meta cells having a meta material structure, which are repetitively formed to surround the exterior and interior of the printed circuit board and a transmission line connected to each of the first conductive plate and the second conductive plate and surround the plurality of meta cells.

Further, in the wireless energy transmission structure according to the preferred embodiment of the present invention, the printed circuit board is formed in a circular or rectangular ring type.

In the wireless energy transmission structure according to the preferred embodiment of the present invention, in the printed circuit board, the width of a ring portion is 3 cm and the length of one side is 30 cm.

In the wireless energy transmission structure according to the preferred embodiment of the present invention, the printed circuit board is made of an FR4 material of which the dielectric constant is 4.4 and the thickness 2.0 mm.

In the wireless energy transmission structure according to the preferred embodiment of the present invention, the disk section varies a capacitor value depending on a resonance frequency.

In the wireless energy transmission structure according to the preferred embodiment of the present invention, the disk section varies the capacitor value by a resonance frequency compensating capacitor installed between the first conductive plate and the second conductive plate.

In the wireless energy transmission structure according to the preferred embodiment of the present invention, the dielectric material is air.

In the wireless energy transmission structure according to the preferred embodiment of the present invention, the dielectric material has dielectric constant of 9.2.

In the wireless energy transmission structure according to the preferred embodiment of the present invention, a width between the first conductive plate and a second conductive plate is 0.28 mm, radii of the first conductive plate and the second conductive plate are 50 mm, and widths of the first conductive plate and the second conducive plate are 30 mm.

In the wireless energy transmission structure according to the preferred embodiment of the present invention, the meta cell includes first meta cells repetitively formed to surround the interior of the printed circuit board and second meta cells repetitively formed to surround the exterior of the printed circuit board.

In the wireless energy transmission structure according to the preferred embodiment of the present invention, the first meta cell and the second meta cell is connected to each other in parallel to form one pair.

In the wireless energy transmission structure according to the preferred embodiment of the present invention, a gap between the first meta cell and the second meta cell is 2.0 mm and a gap between a line width and a line of the first meta cell and the second meta cell is 1.0 mm.

In the wireless energy transmission structure according to the preferred embodiment of the present invention, the meta cell has a circular or rectangular shape.

In the wireless energy transmission structure according to the preferred embodiment of the present invention, the meta cell has a spiral structure.

In the wireless energy transmission structure according to the preferred embodiment of the present invention, the meta cell has a split ring structure.

In the wireless energy transmission structure according to the preferred embodiment of the present invention, the meta cell is formed by two or more split rings and split portions of the split ring are formed at locations facing each other.

In the wireless energy transmission structure according to the preferred embodiment of the present invention, the transmission line has a structure in which the meta cell is etched.

DESCRIPTION OF THE PREFERRED EMBODIMENTS

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

In the specification, in adding reference numerals to components throughout the drawings, it is to be noted that like reference numerals designate like components even though components are shown in different drawings.

Further, in describing the present invention, when it is determined that a detailed description of the known art related to the present invention may obscure the gist of the present invention, the detailed description will be omitted.

Hereinafter, the preferred embodiments of the present invention will be described in detail with reference to the accompanying drawings.

Figure 1:
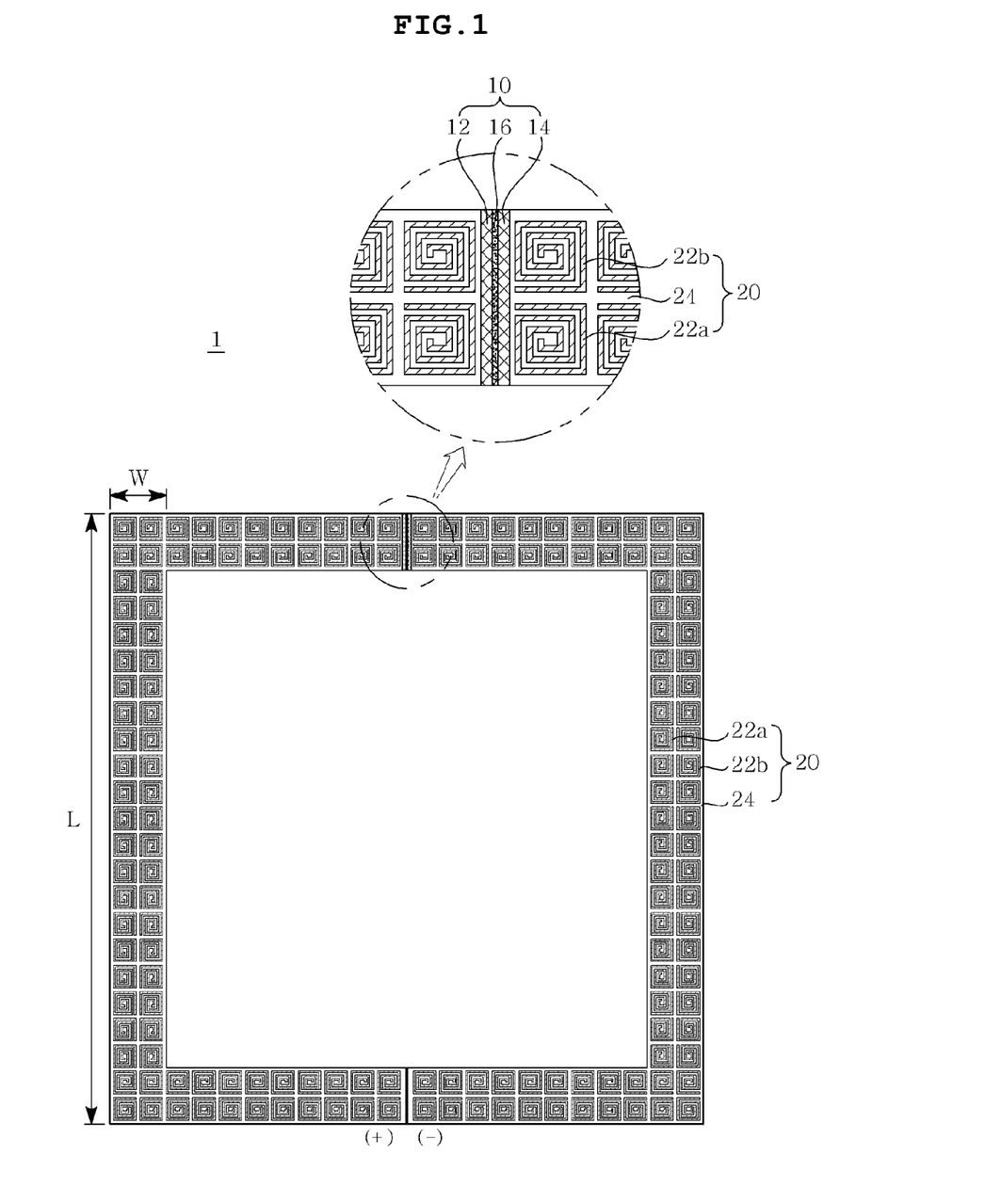
FIG. 1 is a diagram showing a wireless energy transmission structure according to an embodiment of the present invention.
Figure 2:
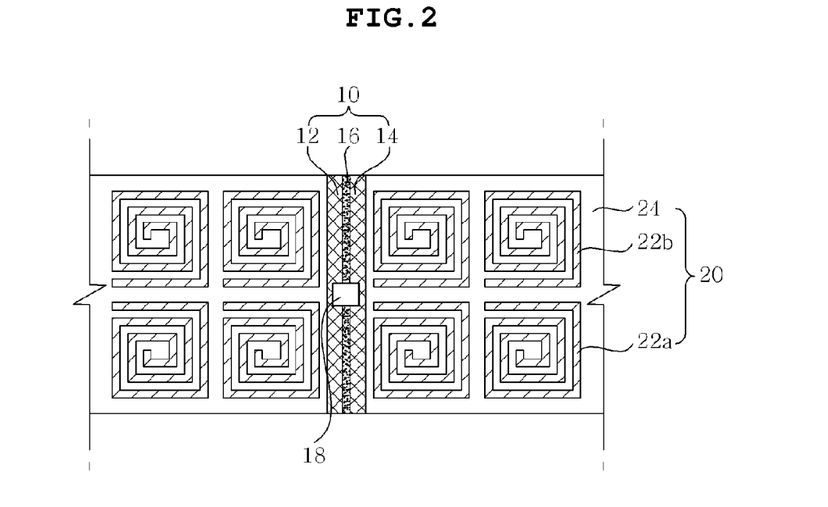
FIG. 2 is a detailed diagram showing a resonance frequency compensating capacitor installed in a disk section shown in FIG. 1.
Figure 3:
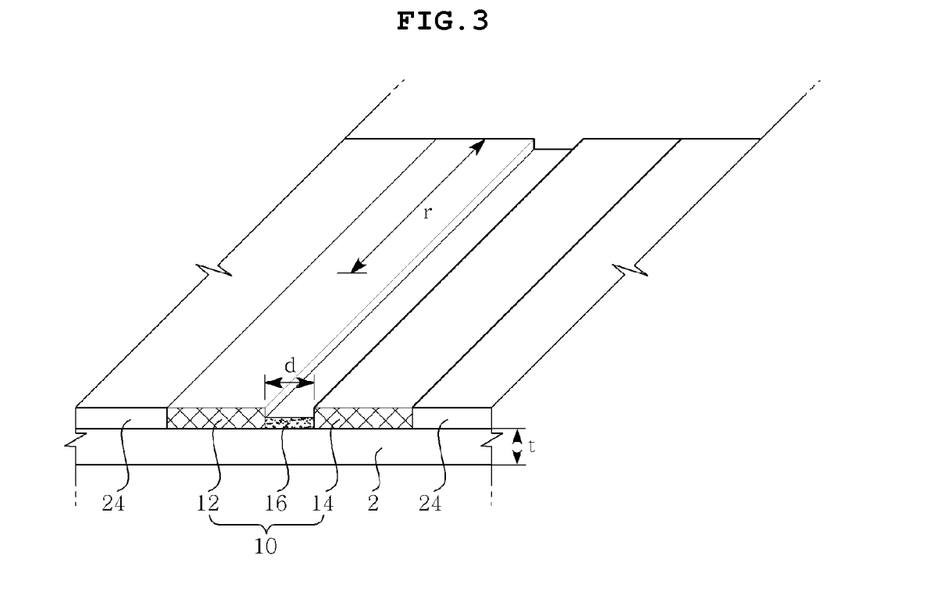
FIG. 3 is a cross-sectional perspective view of the disk section shown in FIG. 1.

FIG. 1 is a diagram showing a wireless energy transmission structure according to an embodiment of the present invention, FIG. 2 is a detailed diagram showing a resonance frequency compensating capacitor installed in a disk section shown in FIG. 1, and FIG. 3 is a cross-sectional perspective view of the disk section shown in FIG. 1.

A wireless energy transmission structure 1 according to an embodiment of the present invention includes a ring-type printed circuit board 2, a disk section 10 constituted by a first conductive plate 12 and a second conductive plate 14 formed on portions of the printed circuit board 2 corresponding to each other to be spaced by a predetermined gap and a dielectric material 16 inserted between the first conductive plate 12 and the second conductive plate 14, and a wire section 20 constituted by a plurality of meta cells 22 having a meta material structure (that is, structure having a negative refractive index), which are repetitively formed to surround the exterior and interior of the printed circuit board 2 and a transmission line 24 connected to each of the first conductive plate 12 and the second conductive plate 14 and surround the plurality of meta cells 22, as shown in FIGS. 1 to 3.

The printed circuit board 2 has any one structure of a cross-section structure or a multilayer structure and is formed in a ring type.

When the printed circuit board 2 has the multilayer structure, the first conductive plate 12, the second conductive plate 14, and the transmission line 24 are connected to each other through a via-hole (not shown).

Meanwhile, the ring-type printed circuit board 2 may have a circular or a rectangular shape and preferably, it has the rectangular shape to have a wider dimension and a longer wire than the circular shape in the same radius length.

In addition, in the ring-type printed circuit board 2, a ring width W (that is, the width of a portion where the wire section 20 is formed) is in the range of 2.5 to 3.5 cm, preferably, 3.0 cm, and the length L of one side is in the range of 27 to 33 cm, preferably, 30 cm.

Further the printed circuit board 2 is made of an FR4 (Flame Retardant 4) material of which the dielectric constant is in the range of 4.0 to 4.8, preferably 4.4 and the thickness t is in the range of 1.8 to 2.2 mm, preferably 2.0 mm.

The disk section 10, which serves as a capacitor at magnetic field-based LC resonance, is constituted by the first conductive plate 12 and the second conductive plate 14 and the dielectric material 16 inserted between the first conductive plate 12 and the second conductive plate 14.

When power supplied from a power supply (not shown) is supplied to the disk section 10 through the transmission line 24, an electric field is generated between the first conductive plate 12 and the second conductive plate 14.

Meanwhile, in order to compensate distortion of a resonance frequency caused by an error generated at the time of manufacturing the wireless energy transmission structure, a resonance frequency compensating capacitor 18 may be installed between the first conductive plate 12 and the second conductive plate 14 in the disk section 10 as shown in FIG. 2.

That is, the disk section 10 may vary a capacitor value according to the needs by using the capacitor constituted by the first conductive plate 12, the second conductive plate 14, and the dielectric material 16 inserted between the first conductive plate 12 and the second conductive plate 14 and the resonance frequency compensating capacitor 18.

Meanwhile, air or a separate dielectric having predetermined dielectric constant ∈ is used as the dielectric material 16 inserted between the first conductive plate 12 and the second conductive plate 14.

As shown in FIG. 3, in the disk section 10, a distance d between the first conductive plate 12 and the second conducive plate 14 is in the range of 0.2 to 0.4 mm, preferably 0.28 mm, radii r of the first conductive plate 12 and the second conductive plate 14 are in the range of 30 to 80 mm, preferably 50 mm, and widths w of the first conductive plate 12 and the second conductive plate 14 are in the range of 20 to 40 mm, preferably 30 mm.

Further, the dielectric constant of the dielectric material 16 is in the range of 8.6 to 10, preferably 9.2.

The wire section 20, which serves as an inductor at the magnetic field-based LC resonance, is constituted by a plurality of first meta cells 22a having a meta material structure, which are repetitively formed to surround the interior of the printed circuit board 2, a plurality of second meta cells 22b having a meta material structure, which are repetitively formed to surround the exterior of the printed circuit board 2, and the transmission line 24 connected to each of the first conductive plate 12 and the second conductive plate 14 and surrounding the plurality of first meta cells 22a and the second meta cells 22b.

At this time, the first meta cell 22a and the second meta cell 22b are connected to each other in parallel to form a pair and the one-pair form is repetitively formed to surround the interior and exterior of the printed circuit board 2 in serial.

The first meta cell 22a and the second meta cell 22b have a circular or rectangular shape, preferably rectangular.

The meta cell 22 has the rectangular shape because the rectangular meta cell 22 has a larger dimension than the circular meta cell 22 in the same radius length and contact portions between the meta material structures in the rectangular meta cell 22 are larger and wider than those in the circular meta cell 22.

The first meta cell 22a and the second meta cell 22b are formed in a spiral resonance structure as shown in FIGS. 1 and 2.

At this time, the first meta cell 22a and the second meta cell 22b are spaced from each other by a gap in the range of 1.5 to 2.5 mm, preferably, 2.0 mm and a gap between a line width and a line of the first meta cell 22a and the second meta cell 22b is in the range of 0.7 to 1.3 mm, preferably 1.0 mm.

The transmission line 24, which is used to receive or supply energy, is connected to each of the first conductive plate 12 and the second conductive plate 14 and has the spiral resonance meta material structure, that is, a structure in which the first meta cell 22a and the second meta cell 22b are etched.

That is, the first meta cell 22a and the second meta cell 22b have an intaglio structure in which the transmission line 24 is etched.

As a result, the transmission line 24 surrounds the first meta cell 22a and the second meta cell 22b.

The transmission line 24 has a thickness in the range of 0.05 to 0.09 mm and is preferably made of copper of 0.07 mm.

In the wireless energy transmission structure according to the embodiment of the present invention, the disk section 10 and the wire section 20 may be formed on only one surface of the printed circuit board 2 or on both surfaces of the printed circuit board 2 as shown in FIG. 1.

Figure 4:
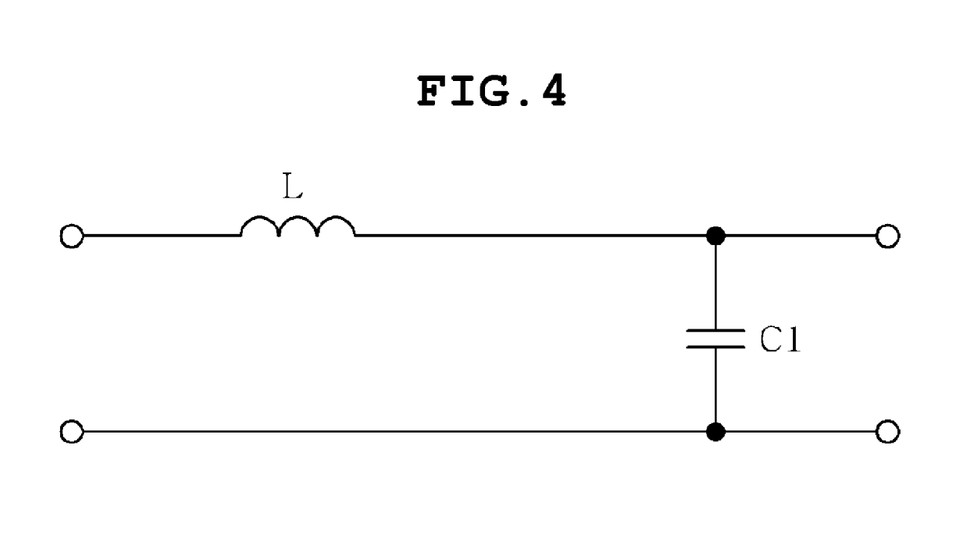
FIG. 4 is a diagram showing an input/output matching circuit of the wireless energy transmission structure shown in FIG. 1.

Meanwhile, the wireless energy transmission structure 1 according to the embodiment of the present invention uses an input/output matching circuit shown in FIG. 4 in order to reduce power lost while being reflected on an input/output terminal of a transceiver.

At this time, the input/output matching circuit is constituted by a serial inductor L and a parallel capacitor C1. An input value and an output value of the inductor L are 3.07 μH and 3.90 μH, respectively and both input and output values of the capacitor C1 are 430 pF.

An operational characteristic measurement value shown in Table 1 can be acquired by coupling the wireless energy transmission structure according to the embodiment of the present invention to the input/output matching circuit of FIG. 4.

TABLE 1

| Operational characteristics | Unit | Result | |
|---|---|---|---|
| Resonance Frequency | MHz | 35.5 | 35.6 |
| Applied power | dBm | 11.5 | 11.5 |
| Transmission distance | m | 0.3 | 0.5 |
| Transmission gain | dB | −2.7 | −12.1 |
| Transmission efficiency | % | 53.7 | 6.2 |

That is, when the same power of 11.5 dBm is applied at transmission distances of 0.3 m and 0.5 m, a transmission gain at the transmission distance of 0.3 m is approximately −2.7 dB at a resonance frequency of 35.5 MHz and a transmission gain at the transmission distance of 0.5 m is approximately −12.1 dB at a resonance frequency of 35.6 MHz and transmission efficiency is approximately 53.7% at the transmission distance of 0.3 m and approximately 6.2% at the transmission distance of 0.5 m.

As shown in Table 1, in the wireless energy transmission structure 1, when a transmission distance between a transmitter and a receiver is increased, inter-capacitance is decreased due to deterioration in inter-coupling characteristics between transmission and reception structures, thereby increasing the resonance frequency.

Further, the transmission efficiency is markedly decreased at a point where the transmission distance is 0.5 m because the coupling characteristics due to resonance between the point when the transmission distance is 0.5 mm and the wireless energy transmission and reception structure are markedly deteriorated from the point when the transmission distance is 0.5 m.

However, since the wireless energy transmission structure 1 according to the embodiment of the present invention has the meta cell 22 in the wire section 20, it can improve the transmission efficiency.

In other words, when a wireless energy transmission structure has the same structure as the wireless energy transmission structure according to the embodiment of the present invention and does not have the meta cell in the wire section (that is, wireless energy transmission structure in the prior art), the operational characteristics are measured as shown in Table 2. As shown in Table 2, the wireless energy transmission structure 1 according to the embodiment of the present invention can improve the transmission efficiency of approximately 11% at the transmission distance of 0.3 m and approximately 2% at the transmission distance of 0.5 m in comparison with the wireless energy transmission structure in the prior art.

TABLE 2

| Operational characteristics | Unit | Result | |
|---|---|---|---|
| Resonance frequency | MHz | 41.8 | 42.7 |
| Applied power | dBm | 11.5 | 11.5 |
| Transmission distance | m | 0.3 | 0.5 |
| Transmission gain | dB | −3.7 | −13.6 |
| Transmission efficiency | % | 42.66 | 4.37 |

As such, since the wireless energy transmission structure 1 according to the embodiment of the present invention has the meta cell having the spiral resonance meta material structure in the wire section 20, it can improve resonance Q characteristics and improve the transmission efficiency in comparison with the wireless energy transmission structure in the prior art.

Further, since the inter-coupling characteristics are improved due to the meta cell having the spiral resonance structure, which is formed in the wire section 20 and the inter-capacitance is thus increased, the wireless energy transmission structure 1 according to the embodiment of the present invention can lower the resonance frequency in comparison with the wireless energy transmission structure in the prior art, thereby reducing the size of the wireless energy transmission structure.

Figure 5:
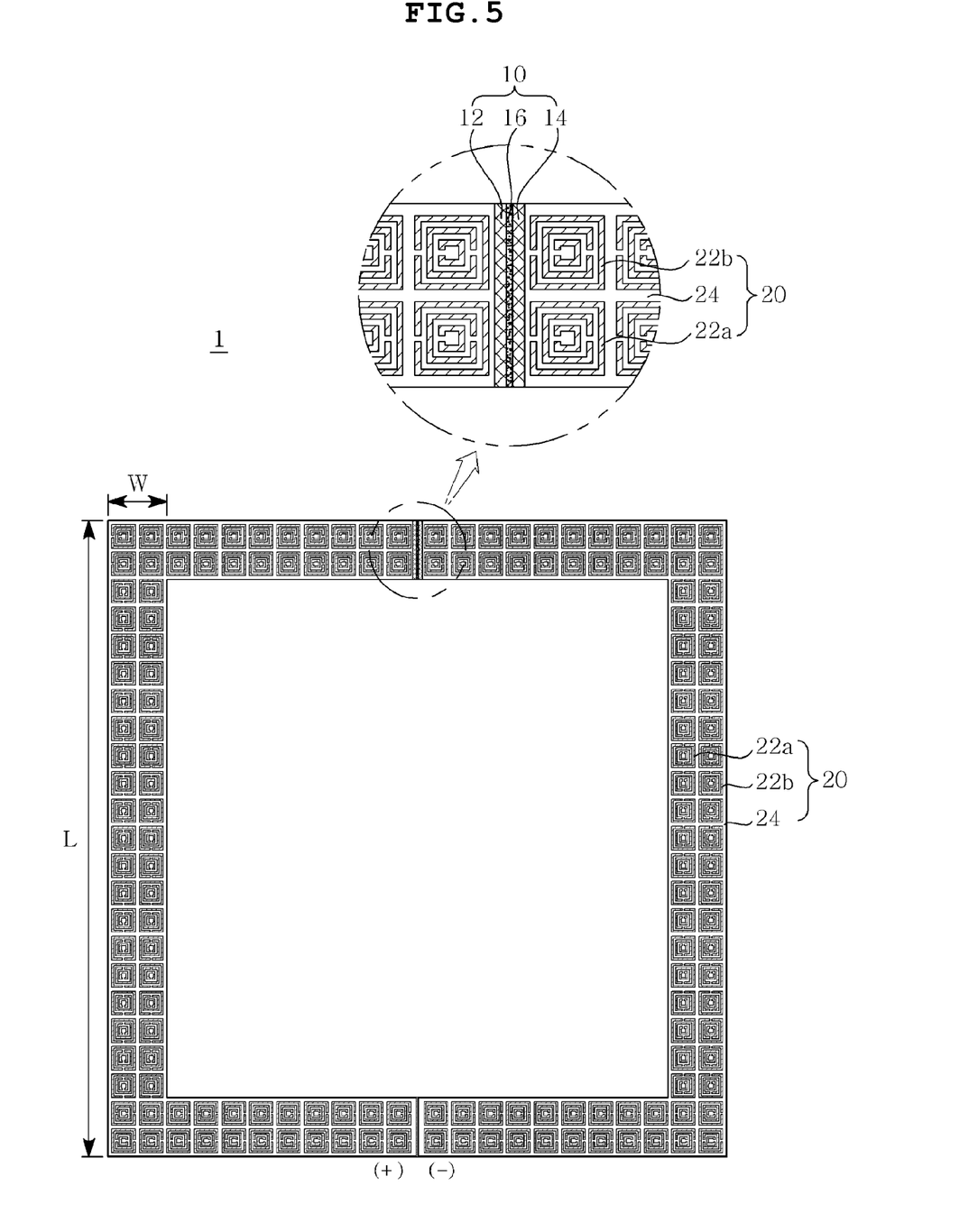
FIG. 5 is a diagram showing a wireless energy transmission structure according to another embodiment of the present invention.

FIG. 5 is a diagram showing a wireless energy transmission structure according to another embodiment of the present invention.

The wireless energy transmission structure 1 according to another embodiment of the present invention includes a ring-type printed circuit board 2, a disk section 10 constituted by a first conductive plate 12 and a second conductive plate 14 formed on portions of the printed circuit board 2 corresponding to each other to be spaced by a predetermined gap and a dielectric material 16 inserted between the first conductive plate 12 and the second conductive plate 14, and a wire section 20 constituted by a plurality of meta cells 22 having a meta material structure, which are repetitively formed to surround the exterior and interior of the printed circuit board 2 and a transmission line 24 connected to each of the first conductive plate 12 and the second conductive plate 14 and surround the plurality of meta cells 22 as shown in FIG. 5.

The wireless energy transmission structure 1 according to another embodiment of the present invention has the same components as the wireless energy transmission structure according to the embodiment of the present invention shown in FIGS. 1 to 3 except that the shape of the meta cell is different and detailed description will be substituted by the above description.

Meanwhile, in the wireless energy transmission structure according to another embodiment of the present invention, the first meta cell 22a and the second meta cell 22b formed in the wire section 20 have a split ring structure as shown in FIG. 5 and split portions of the a ring formed inside and a ring formed outside are formed at locations facing each other (that is, opposite to each other).

The first meta cell 22a and the second meta cell 22b may have two split ring structures as shown in FIG. 5 or one or three or more structures.

When the first meta cell 22a and the second meta cell 22b have three or more split ring structures, split portions of adjacent split rings are formed at locations facing each other.

Figure 6:
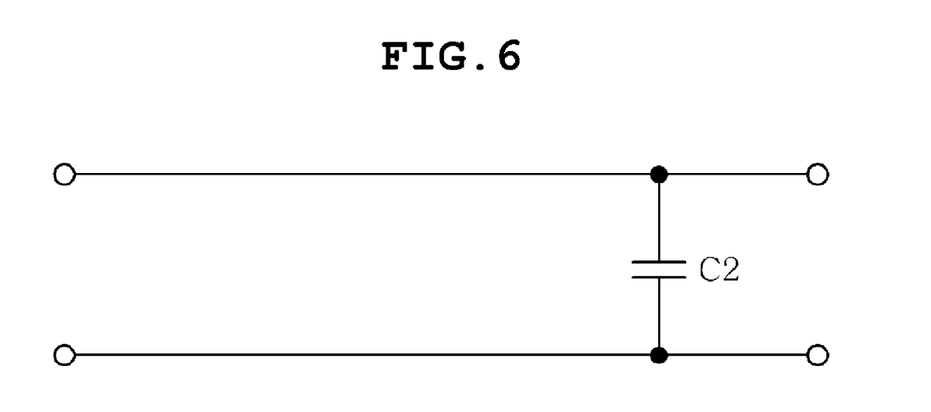
FIG. 6 is a diagram showing an input/output matching circuit of the wireless energy transmission structure shown in FIG. 5.

The wireless energy transmission structure 1 according to another embodiment of the present invention is coupled with an input/output matching circuit shown in FIG. 6 and is similar to the wireless energy transmission structure according to the embodiment of the present invention shown in FIG. 1 in terms of the operational characteristics, but it has the resonance frequency lower than the wireless energy transmission structure according to the embodiment of the present invention.

According to the present invention, it is possible to improve a transmission distance and transmission efficiency of wireless energy, minimize a wireless energy transmission structure, and easily manufacture a wireless energy transmission structure.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A wireless energy transmission structure, comprising:
a ring-type printed circuit board;
a disk section constituted by a first conductive plate and a second conductive plate formed on portions of the printed circuit board corresponding to each other to be spaced by a predetermined gap and a dielectric material inserted between the first conductive plate and the second conductive plate; and
a wire section constituted by a plurality of meta cells having a meta material structure, which are repetitively formed to surround the exterior and interior of the printed circuit board and a transmission line connected to each of the first conductive plate and the second conductive plate and surrounding the plurality of meta cells.

2. The wireless energy transmission structure as set forth in claim 1, wherein the printed circuit board is formed in a circular or rectangular ring type.

3. The wireless energy transmission structure as set forth in claim 1, wherein in the printed circuit board, the width of a ring portion is 3 cm and the length of one side is 30 cm.

4. The wireless energy transmission structure as set forth in claim 1, wherein the printed circuit board is made of an FR4 material of which the dielectric constant is 4.4 and the thickness 2.0 mm.

5. The wireless energy transmission structure as set forth in claim 1, wherein the disk section varies a capacitor value depending on a resonance frequency.

6. The wireless energy transmission structure as set forth in claim 5, wherein the disk section varies the capacitor value by a resonance frequency compensating capacitor installed between the first conductive plate and the second conductive plate.

7. The wireless energy transmission structure as set forth in claim 1, wherein the dielectric material is air.

8. The wireless energy transmission structure as set forth in claim 1, wherein the dielectric material has dielectric constant of 9.2.

9. The wireless energy transmission structure as set forth in claim 1, wherein a width between the first conductive plate and a second conductive plate is 0.28 mm, radii of the first conductive plate and the second conductive plate are 50 mm, and widths of the first conductive plate and the second conducive plate are 30 mm.

10. The wireless energy transmission structure as set forth in claim 1, wherein the meta cell includes first meta cells repetitively formed to surround the interior of the printed circuit board; and second meta cells repetitively formed to surround the exterior of the printed circuit board.

11. The wireless energy transmission structure as set forth in claim 10, wherein the first meta cell and the second meta cell are connected to each other in parallel to form one pair.

12. The wireless energy transmission structure as set forth in claim 10, wherein a gap between the first meta cell and the second meta cell is 2.0 mm and a gap between a line width and a line of the first meta cell and the second meta cell is 1.0 mm.

13. The wireless energy transmission structure as set forth in claim 1, wherein the meta cell has a circular or rectangular shape.

14. The wireless energy transmission structure as set forth in claim 1, wherein the meta cell has a spiral structure.

15. The wireless energy transmission structure as set forth in claim 1, wherein the meta cell has a split ring structure.

16. The wireless energy transmission structure as set forth in claim 15, wherein the meta cell is formed by two or more split rings and split portions of the split ring are formed at locations facing each other.

17. The wireless energy transmission structure as set forth in claim 1, wherein the transmission line has a structure in which the meta cell is etched.

* * * * *